US012560535B2

(12) United States Patent
Takahashi et al.

(10) Patent No.: US 12,560,535 B2
(45) Date of Patent: Feb. 24, 2026

(54) ULTRAVIOLET-VISIBLE ABSORPTION SPECTROSCOPY FOR GEMSTONE IDENTIFICATION

(71) Applicant: Gemological Institute of America, Inc. (GIA), Carlsbad, CA (US)

(72) Inventors: Hiroshi Takahashi, Morristown, NJ (US); Pradeep N. Perera, Fair Lawn, NJ (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 213 days.

(21) Appl. No.: 18/379,653

(22) Filed: Oct. 12, 2023

(65) Prior Publication Data

US 2024/0060879 A1     Feb. 22, 2024

Related U.S. Application Data

(63) Continuation of application No. 17/382,317, filed on Jul. 21, 2021, now Pat. No. 11,828,703.

(60) Provisional application No. 63/058,385, filed on Jul. 29, 2020.

(51) Int. Cl.
| | |
|---|---|
| *G01N 21/33* | (2006.01) |
| *G01N 21/64* | (2006.01) |
| *G01N 21/87* | (2006.01) |
| *G01J 3/44* | (2006.01) |

(52) U.S. Cl.
CPC .......... *G01N 21/33* (2013.01); *G01N 21/645* (2013.01); *G01N 21/87* (2013.01); *G01J 3/4406* (2013.01); *G01N 2021/6471* (2013.01); *G01N 2201/061* (2013.01); *G01N 2201/0636* (2013.01)

(58) Field of Classification Search
None
See application file for complete search history.

(56) References Cited

U.S. PATENT DOCUMENTS

| | | | | |
|---|---|---|---|---|
| 8,859,969 | B2 * | 10/2014 | Micheels | ................ G01J 3/024 250/339.07 |
| 10,684,230 | B2 | 6/2020 | Wang et al. | |
| 11,828,703 | B2 | 11/2023 | Takahashi et al. | |
| 2010/0111251 | A1 | 5/2010 | Yellepeddi et al. | |
| 2010/0220311 | A1 | 9/2010 | Hall et al. | |
| 2011/0310246 | A1 | 12/2011 | Hornabrook et al. | |

(Continued)

FOREIGN PATENT DOCUMENTS

| | | | |
|---|---|---|---|
| CN | 208588682 | U | 3/2019 |
| CN | 214668643 | U * | 11/2021 |

(Continued)

OTHER PUBLICATIONS

Anonymous, "?", Sep. 15, 2015, pp. 1-4, retrieved from the internet: URL:https://web.archive.org/web/20150915054145/https://www.thorlabs.com/newgrouppage9.cfm?objectgroup_ID=7794.

(Continued)

*Primary Examiner* — Marcus H Taningco
(74) *Attorney, Agent, or Firm* — DLA PIPER LLP (US); Blake W. Jackson; Thomas J. Fuller

(57) ABSTRACT

Systems and methods here may be used for capturing and analyzing spectrometer data of multiple sample gemstones on a stage, including mapping digital camera image data of samples, for both reflective and transmission modes.

17 Claims, 15 Drawing Sheets
(11 of 15 Drawing Sheet(s) Filed in Color)

(56)         References Cited

U.S. PATENT DOCUMENTS

| | | | |
|---|---|---|---|
| 2013/0256534 A1 | 10/2013 | Micheels et al. | |
| 2013/0321792 A1* | 12/2013 | Shapiro | G01N 21/87 |
| | | | 356/30 |
| 2014/0157817 A1 | 6/2014 | Hall et al. | |
| 2014/0347472 A1* | 11/2014 | Davis | G01N 21/3563 |
| | | | 382/109 |
| 2016/0041106 A1 | 2/2016 | Smith et al. | |
| 2016/0178530 A1 | 6/2016 | Davies et al. | |
| 2017/0095583 A1 | 4/2017 | Stamminger et al. | |
| 2017/0241913 A1 | 8/2017 | Gu | |
| 2018/0172599 A1 | 6/2018 | Wang et al. | |
| 2019/0219513 A1* | 7/2019 | Blank | G01N 21/63 |

FOREIGN PATENT DOCUMENTS

| | | | |
|---|---|---|---|
| CN | 116157658 A | 5/2023 | |
| EP | 4165379 A1 | 4/2023 | |
| IL | 299958 A | 3/2023 | |
| JP | 2000131224 A | 5/2000 | |
| JP | 2006119130 A | 5/2006 | |
| JP | 2012063321 A | 3/2012 | |
| JP | 2015134722 A | 7/2015 | |
| JP | 2016528489 A | 9/2016 | |
| JP | 2019533173 A | 11/2019 | |
| JP | 2020506369 A | 2/2020 | |
| JP | 2023-536448 A | 8/2023 | |
| TW | 201823705 A | 7/2018 | |
| TW | I792457 B | 2/2023 | |
| TW | 202317948 A | 5/2023 | |
| WO | 2015007873 A1 | 1/2015 | |
| WO | 2022/026274 A1 | 2/2022 | |

OTHER PUBLICATIONS

Eaton-Magaña, S., et al., "Fluorescence Spectra of Colored Diamonds Using a Rapid, Mobile Spectrometer," Gems & Gemology, vol. 43, No. 4, Dec. 2007, pp. 332-351.

Extended European Search Report for European Application No. 21849603.2, dated Nov. 22, 2024, 19 Pages.

International Preliminary Report on Patentability for International Application No. PCT/US2021/042661, dated Feb. 9, 2023, 10 Pages.

International Search Report and Written Opinion for International Application No. PCT/US2021/042661, mailed Dec. 16, 2021, 13 Pages.

Office Action and Search Report from Taiwan Patent Application No. 112100321, dated Jun. 13, 2023, 12 pages.

Office Action for Chinese Patent Application No. 202180059271.2, mailed Jul. 4, 2025, 13 pages.

Office Action for Japanese Patent Application No. 2023-505681, mailed May 7, 2025, 6 pages.

Partial Supplementary European Search Report for Application No. 21849603.2, dated Jul. 25, 2024, 18 pages.

\* cited by examiner

[1] Set integration time and average number
[2] Device calibration (measure dark and background)

Dark (shutter close)

1210

Background (shutter open)

1220

[3] Put the sample under the probe and measure the signal

1230

$Absorption = Log_{10}((background - dark)/(I - dark))$ $Reflectance = (I - dark) / (background - dark)$

ULTRAVIOLET-VISIBLE ABSORPTION SPECTROSCOPY FOR GEMSTONE IDENTIFICATION

CROSS REFERENCE TO RELATED APPLICATIONS

This application is a Continuation of and claims priority to U.S. patent application Ser. No. 17/382,317 filed on Jul. 21, 2021, which relates to and claims priority to U.S. Provisional Application No. 63/058,385 filed on Jul. 29, 2020, both of which are hereby incorporated by reference in their entireties.

FIELD

The field includes systems and methods for ultraviolet-visible absorption spectrometry for gemstone identification.

BACKGROUND

Proper and accurate identification of gemstones is useful in analyzing and valuing them properly. Before, there were no commercially available instruments for diamond, colored stones and pearls to measure translucent samples and no dedicated way to measure a mounted stone in such a way because the systems could not support rings, necklaces, or other mounts. The result was a dismantling of the mounted jewelry for analysis. Furthermore, it was difficult to modify the old hardware to add more features such as but not limited to Fluorescence, Phosphorescence, and Time-resolved measurements.

There exists a need for an automated system that allows for efficient testing that is both accurate and able to be used in many different circumstances for multiple testing scenarios.

SUMMARY

Systems and methods here may be used for reflectance spectrometer analysis, the system including a computer with a processor and memory, in communication with a spectrometer, a first light source, and a second light source, with a reflectance subsystem including, a bifurcated reflectance subsystem fiber with a probe end mounted on a reflectance subsystem frame configured to allow the reflectance subsystem probe end to raise and lower over a reflectance subsystem stage, and in some examples, a first of the bifurcated reflectance subsystem fibers is in communication with the light source and a second of the bifurcated reflectance subsystem fibers is in communication with the spectrometer. In some examples, the first and second bifurcated reflectance subsystem fibers is approximately 600 microns in diameter and separated by between 0.7 and 1.2 mm as measured from a center of each of the first and second bifurcated reflectance subsystem fibers. In some examples, the reflectance subsystem stage is an evaporating dish configured to hold liquid nitrogen and a sample. In some examples, the reflectance subsystem stage is made of Teflon. In some examples, the system includes a mount with a base and an arm configured to receive mounted jewelry, wherein the arm is made of reflective material. In some examples, the first and second of the bifurcated fibers each have a core diameter of 600 microns or greater. In some examples, the jewelry mount is made of aluminum or Teflon. In some examples, the reflectance light source has a wavelength between 190 nm and 2500 nm. In some examples, the reflectance light source is either deuterium and/or tungsten halogen. In some examples, the reflectance light source is a short wave ultra-violet light emitting diode configured to emit a principal wavelength of approximately 254 nm, or is a long wave ultra-violet light emitting diode configured to emit a principal wavelength of approximately 365 nm, or a filtered deuterium lamp configured to emit a wavelength between 250 nm and 370 nm. has a wavelength between 200 nm and 400 nm for a fluorescence analysis.

Systems and methods here may be used for analyzing samples using reflectance spectrometer analysis, for example, by a computer with a processor and memory, in communication with a spectrometer, and a first light source, and a second light source, causing a light signal to be sent from the light source through an excitation fiber to a probe end mounted on a subsystem frame configured to be raised and lowered over a sample stage, causing the light signal to switch off, receiving a response signal from the sample on the sample stage by a collection fiber to the spectrometer, and causing display of a fluorescence graph of the received response signal. In some examples, before sending a first light signal, calibrating by, setting an integration time and average number on software running on the computer, conducting dark and measurements, putting the sample under the reflectance probe and measuring a signal. In some examples, the light source is a light emitting diode light source capable of emitting 265 nm and 365 nm wavelengths. In some examples, the excitation fiber and the collection fiber each have a core diameter of 600 microns or greater.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the embodiments described in this application, reference should be made to the Detailed Description below, in conjunction with the following drawings in which like reference numerals refer to corresponding parts throughout the figures.

DETAILED DESCRIPTION

Figure 1:
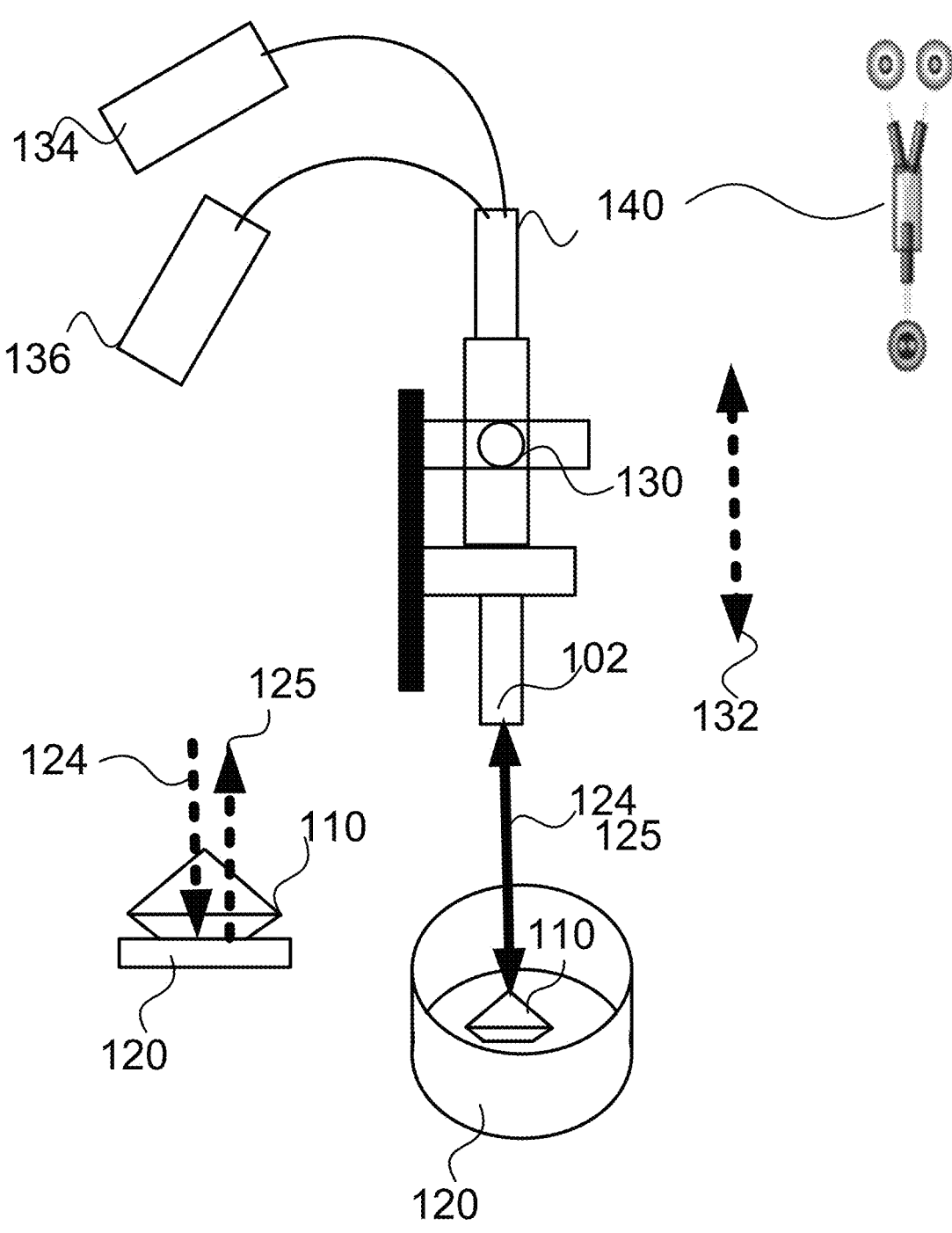
FIG. 1 is an illustration of an example spectroscopy system in accordance with certain aspects described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Systems and methods here may be used for reflectance mode absorption measurement of translucent gem stones and pearls and to measure absorption spectra of mounted gem stone and diamonds.

Systems described here include dedicated Ultraviolet (UV)/Visible light (Vis) spectrometer with capabilities that are specific to diamond, gem, and pearl industries for research, identification, classification and/or grading purposes. Such systems may deliver multiple capabilities in one unit that extend the use of UV/Vis absorption spectroscopy to these industries as described below.

The UV/Vis spectrometer described here may include using reflection collection geometry that allows measurement of translucent samples (opaque colored stones and pearls) and allows measurement of mounted samples with a uniquely designed sample mount. Some example embodiments include having the capability of measuring diamonds at Liquid Nitrogen temperatures, measuring fluorescence and phosphorescence of diamonds and colored stones with fiber coupled reflection mode, and the capability of measuring time evolvement of absorption due to thermal and photo perturbations.

Systems and methods here may include analysis of multiple gemstones such as diamonds, colored stones, and pearls. The systems may use an absorption spectrum of between 250 nm and 1000 nm with a measurement time of less than 10 seconds. Using the systems here, there is no size limitation for analyzing a stone sample and both loose and mounted stones may be easy and quickly analyzed.

Reflectance Probe for Diamond/Colored Stones/Pearl Measurements

Reflection probes may provide a simpler and more straight forward way to measure small colored stones (melee), larger/darker colored stones (mounted or unmounted), translucent stones, diamonds (small and large, mounted or unmounted) and/or pearls.

Absorption spectra of pearls can be used for grading/classification/quality measurements, for example body color, overtone, and/or luster. However, standard transmission mode UV/Vis spectrometers may not be able to collect absorption spectra of pearls due to opaque/translucent nature. Systems and methods here may be implemented to employ reflectance mode absorption spectroscopy to collect absorption spectra reliably, circumventing issues associated with collecting UV/Vis spectra. In such examples, a major portion of the incident light may undergo specular reflection at the surface of pearls and translucent stones and therefore overwhelm the signal at the detector thus dwarfing the absorption spectrum. In such examples, absorption spectra of these samples may still be collected by using a bifurcated fiber with two fiber lines with the core size of 600 μm as described in FIG. 1 with one to transmit the light on to the sample and the other to transmit light back to the spectrometer/detector, and with a separation between them between 0.7-1.2 mm, fiber core center to fiber core center, and placing the fiber on the surface of the sample. By placing the fiber on the surface of the sample, this method may allow a physical blocking of specular reflectance from the surface and allow collection of light that has penetrated the surface and scatter back to surface through diffuse reflection. This configuration may increase the ratio between diffuse reflection to specular reflection and allow us to observe important absorption features.

In such examples, fiber arrangement and fiber size may affect the functionality of the systems. In some examples, having a collection fiber physically set up away from the excitation fiber may allow for a minimization of the contribution from specular reflection to the absorption spectrum thus improving the absorption contrast.

Such arrangements may be useful for stones such as jadeite and pearl which have stronger surface reflection. In such cases, with the fiber very close to the surface of the stone (or contacting the surface of the stone) they collection fiber may be able to physically block specular reflection while collecting light reflecting back from inside the stone. This may affect the signal to noise ratio.

FIG. 1 shows an example of a spectrometer probe 102 in a reflectance mode on a melee or loose stone 110. In some examples, an evaporating flat dish 120 may be used to hold liquid nitrogen. In such examples, the loose stone 110 may be set table down in the dish 120 and liquid nitrogen filled up to just below the culet. In some examples, a Teflon or similar stage may be used to hold the sample gemstone in place of or in addition to the evaporating dish 120. The probe 102 may be mounted on a frame 130 that is able to move up and down 132. The probe 130 may be in communication with a light source 134 and a spectrometer 136 to obtain graphs of absorption as described herein. In such examples, the probe sends light down 124 through the sample stone 110 which may reflect off the teflon surface 120 and back up 125 through the sample stone 110.

In some examples, a light source 134 used to excite the stones may have a wavelength range of between 190-2500 nm. Such a light may have a source lifetime of around 1,000 hours and a nominal bulb power of 26 W for deuterium, 20 W for tungsten halogen. In some examples, this may be an Ocean Insight: DH-2000-BAL. Another example light source 134 may include but is not limited to one with a wavelength range of between 360-2400 nm. Such an example may have a source lifetime of 10,000 hours and a nominal bulb power of 4.75 W for a tungsten halogen example. Such an example may be an Ocean Insight: HL-2000-FHSA-LL.

In the system described herein, a spectrometer 136 is used to analyze the excited/reflected light from the sample 110. In some examples, the spectrometer 136 may have a wavelength range of between 200-1100 nm and have an optical resolution 2.6 nm (25 μm slit, grating 300 lines/mm). In some examples, this may be a Ocean Insight QEPro (high dynamic range). The example light source and spectrometer may be coupled to a fiber line 140 for transmission of the light waves (detail included).

Figure 2:
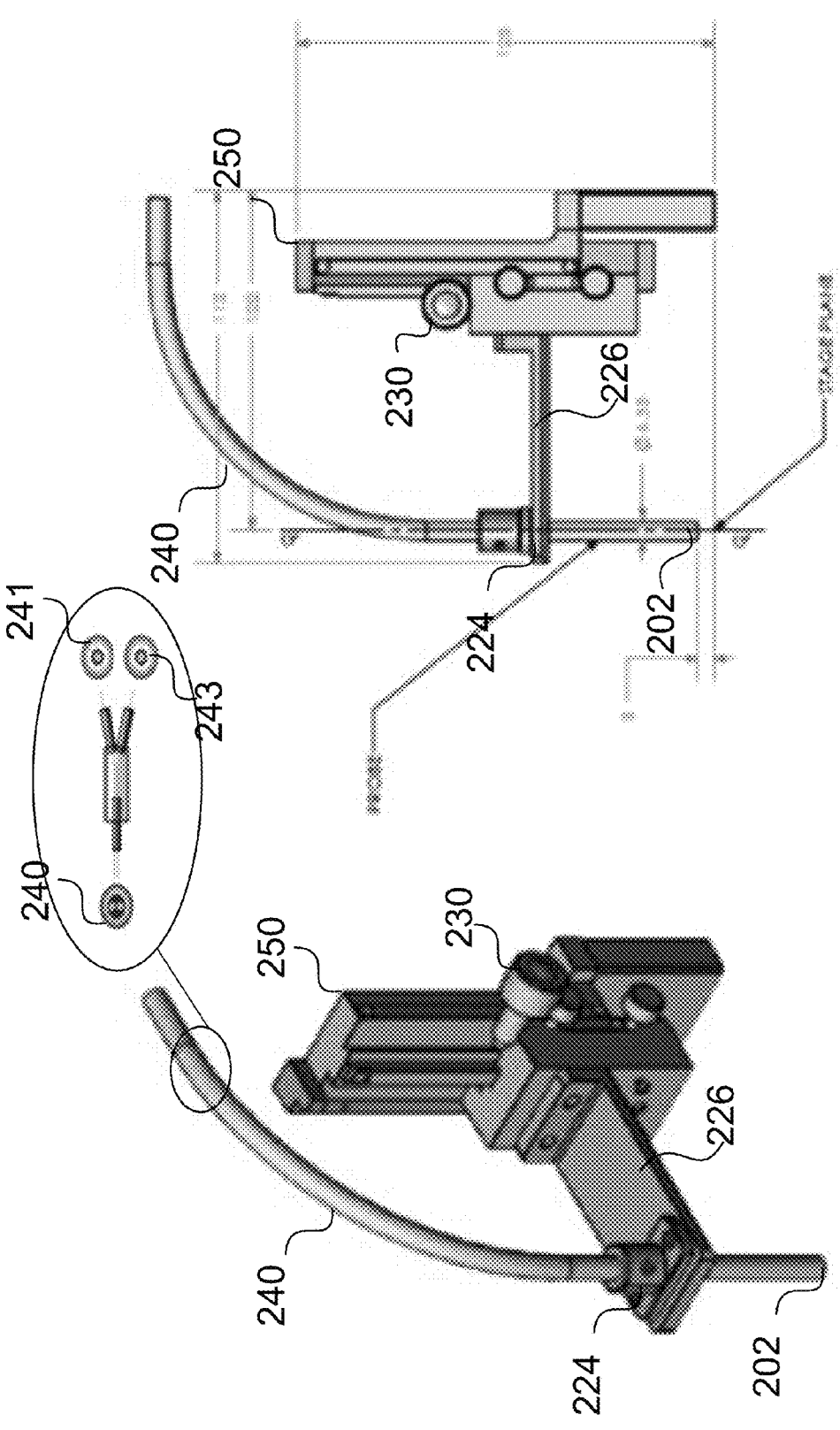
FIG. 2 is another illustration of an example spectroscopy system in accordance with certain aspects described herein.

FIG. 2 shows another angle and different features of the reflector setup hardware from FIG. 1. FIG. 2 shows the probe end 202 mounted 224 on a bracket 226 which is mounted on a vertical track system 250. The vertical track system 250 could be any number of tracks with worm gears, cog wheels, screw gear, etc. with associated knobs 230 to actuate. Such tracks may be manually or electrically motor driven, and if motor driven, in communication with a computer system to remotely operate. The example light source and spectrometer (not shown in FIG. 2) may be coupled to a fiber line 240 for transmission of the light waves (detail included). In some examples, this may be a UV-Visible Bifurcated Fiber with a UV-Visible Bifurcated Fibers Core 241, 243 with one of each of the bifurcated lines running to the spectrometer and light source. In some examples, the core is 600 mm. Other example fiber lines may be used, this being merely an example.

Figure 3:
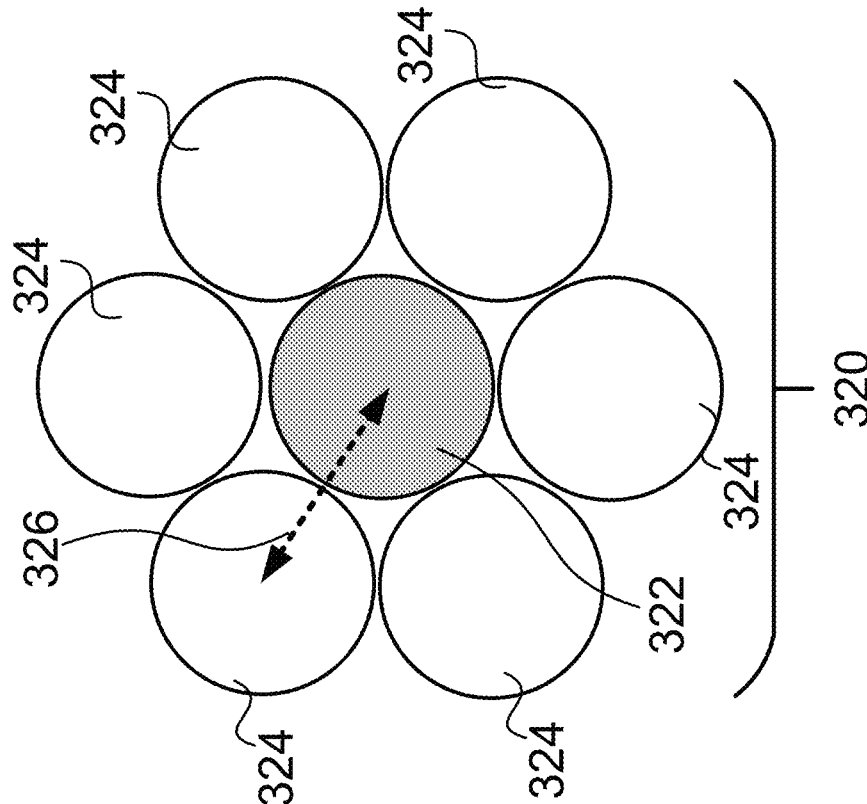
FIG. 3 is an illustration of an example fiber arrangements in accordance with certain aspects described herein.
Figure 3:
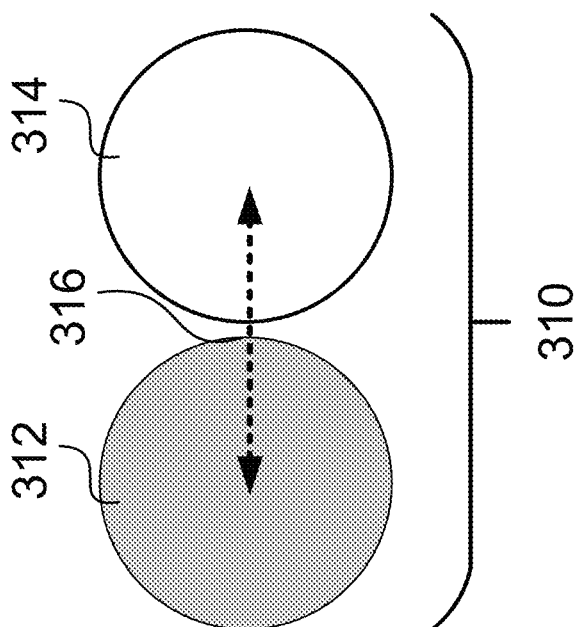

FIG. 3 shows end-on, cut-away views of example fiber lines or bundles (140 in FIG. 1) which may be used in the systems described herein. 310 shows an example arrangement with one fiber line 312 for collection in communication with the spectrometer (136 in FIG. 1) and one fiber line 314 for excitation in communication with the light source (134 in FIG. 1). In such examples, a bifurcated or side-by-side arrangement of fiber lines may be made, and may be combined or covered by a material so the fiber lines become one unit or bundle. In this example, each fiber line 312, 314 is a 600 micron core diameter fiber. In some examples, each fiber line 312, 314 has a core diameter of greater than 600 microns. In such examples, the distance 316 between the center of each fiber line 312, 314 is approximately 700 microns. In some examples, the distance 316 between the center of each fiber line 312, 314 is between 650 microns and 750 microns.

FIG. 3 shows a second example cut away view of fiber lines 320 with one fiber line 322 for collection in communication with the spectrometer (136 in FIG. 1) and six fiber lines 324 for excitation in communication with the light source (134 in FIG. 1). In the example, he excitation fiber lines 324 are arranged radially around the center collection fiber 322. In this example, each fiber line 322, 324 is a 400 micron diameter fiber.

In such examples, the distance 326 between the center of the central fiber line 322, to one of the radially arranged excitation fiber lines, 324 is approximately 500 microns. In some examples, the distance 326 between the center of the central fiber line 322, to one of the radially arranged excitation fiber lines, 324 is between 450 microns and 550 microns.

Figure 4:
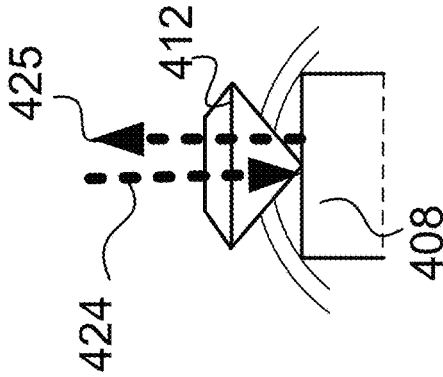
FIG. 4 is an illustration of an example spectroscopy holder in accordance with certain aspects described herein.
Figure 4:
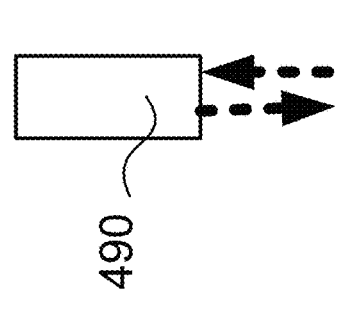
Figure 4:
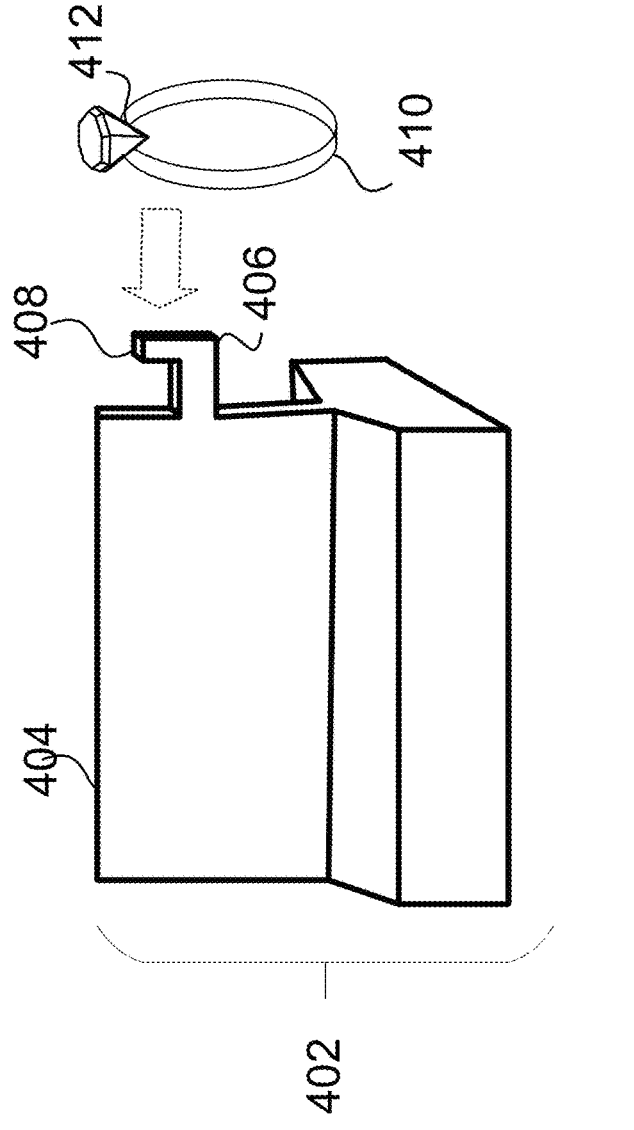

Reflectance probes such as those in FIG. 1 and FIG. 2 may also be used with mounted jewelry as shown in FIG. 4. Mounted jewelry, of stones mounted on rings, pendants, necklaces, etc. often include a metal or mount portion that makes it difficult to measure and analyze for various reasons, including but not limited to the situation that many jewelry pieces 420 are bezel mounted and therefore either it is difficult to place a reflective material to collect absorbed light with reflectance geometry and/or there are no straight path for light because of the metal ring to be used for transmission absorption geometry.

These hurdles may be resolved in one example by utilizing a jewelry mount as shown in FIG. 4. In FIG. 4, a jewel mount 402 may include a base 404 and an arm 406. The arm 406 may be shaped with an elbow bend to allow a bezel mounted ring 410 with a bottom of the stone 412 open, to rest on the top 408 of the arm 406. In the example shown, the top 408 of the mount arm 406 may include a polished or coated surface, such as but not limited to polished aluminum, Teflon, or other reflective material that acts as a reflectance substrate 408. Is some examples, other metals are used, or coated on the arm 406 to provide the reflective backdrop for analysis. Such a sample mount 402 may be universal and can be re-designed for other types of jewelry easily with differently shaped arms 406 with sizes to accommodate differently shaped mounted jewelry.

In use, such a mount 402 may allow for the reflectance probe 490 to analyze a gemstone 412 while it is mounted on a ring 410 by using the top 408 of the arm 406 as its reflectance surface, like surface 120 in FIG. 1.

Figure 5:
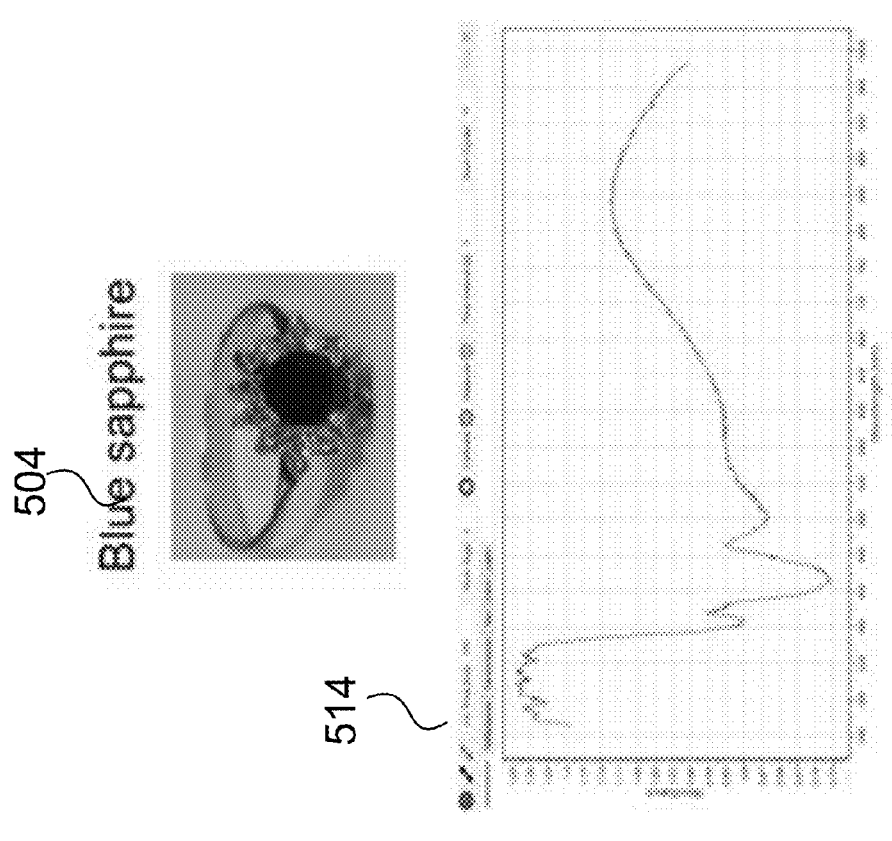
FIG. 5 is an illustration of an example charts calculated in accordance with certain aspects described herein.
Figure 5:
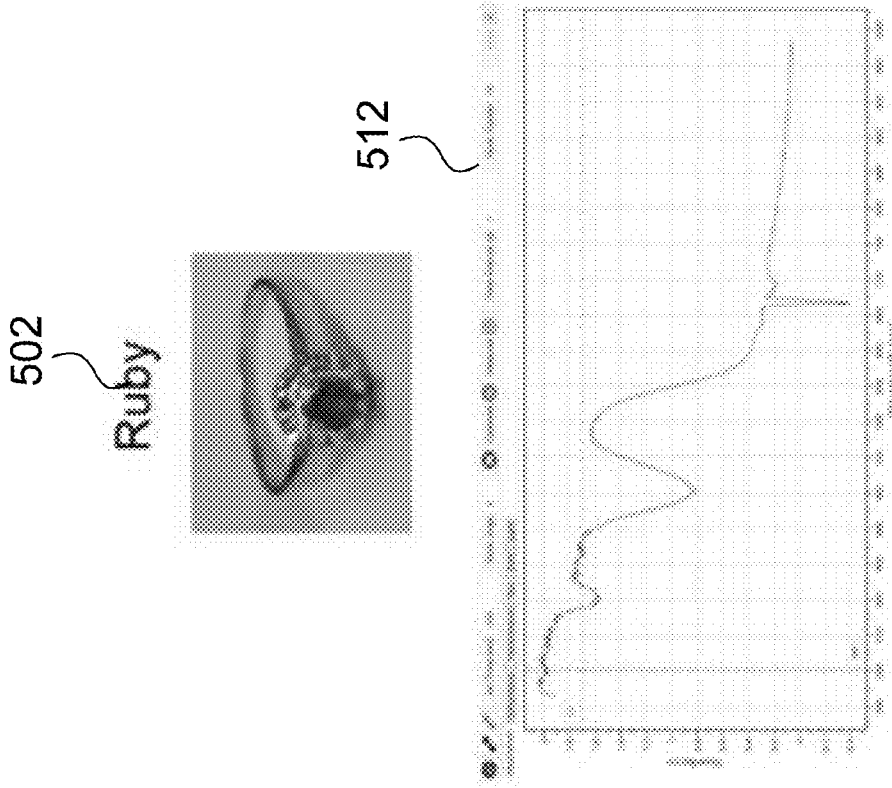

FIG. 5 shows two examples of absorbance spectrum graphs over different wavelengths for mounted jewelry of a ruby 502, 512 and blue sapphire 504, 514 as measured on the mount shown in FIG. 4.

Figure 6:
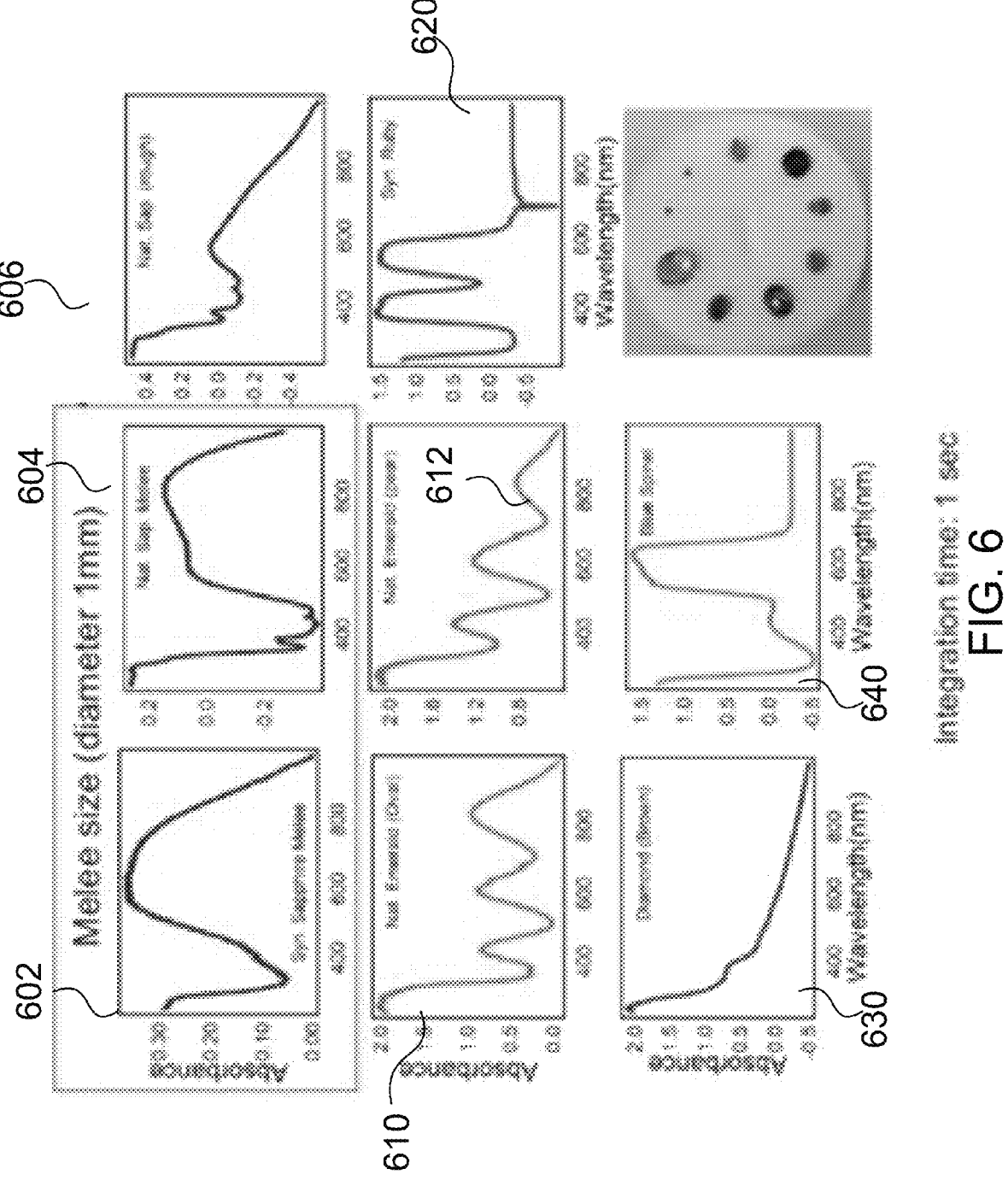
FIG. 6 is an illustration of an example charts calculated in accordance with certain aspects described herein.

FIG. 6 shows example graphs of absorbance against wavelength in nm for various samples of colored stones, such as Synthetic Sapphire melee 602, natural sapphire melee 604, natural sapphire rough 606 as well as natural emerald oval 610, natural emerald pear shape 612, synthetic ruby 620, diamond brown 630 and blue spinel 640. All the graphs show integration time of one second.

Figure 7:
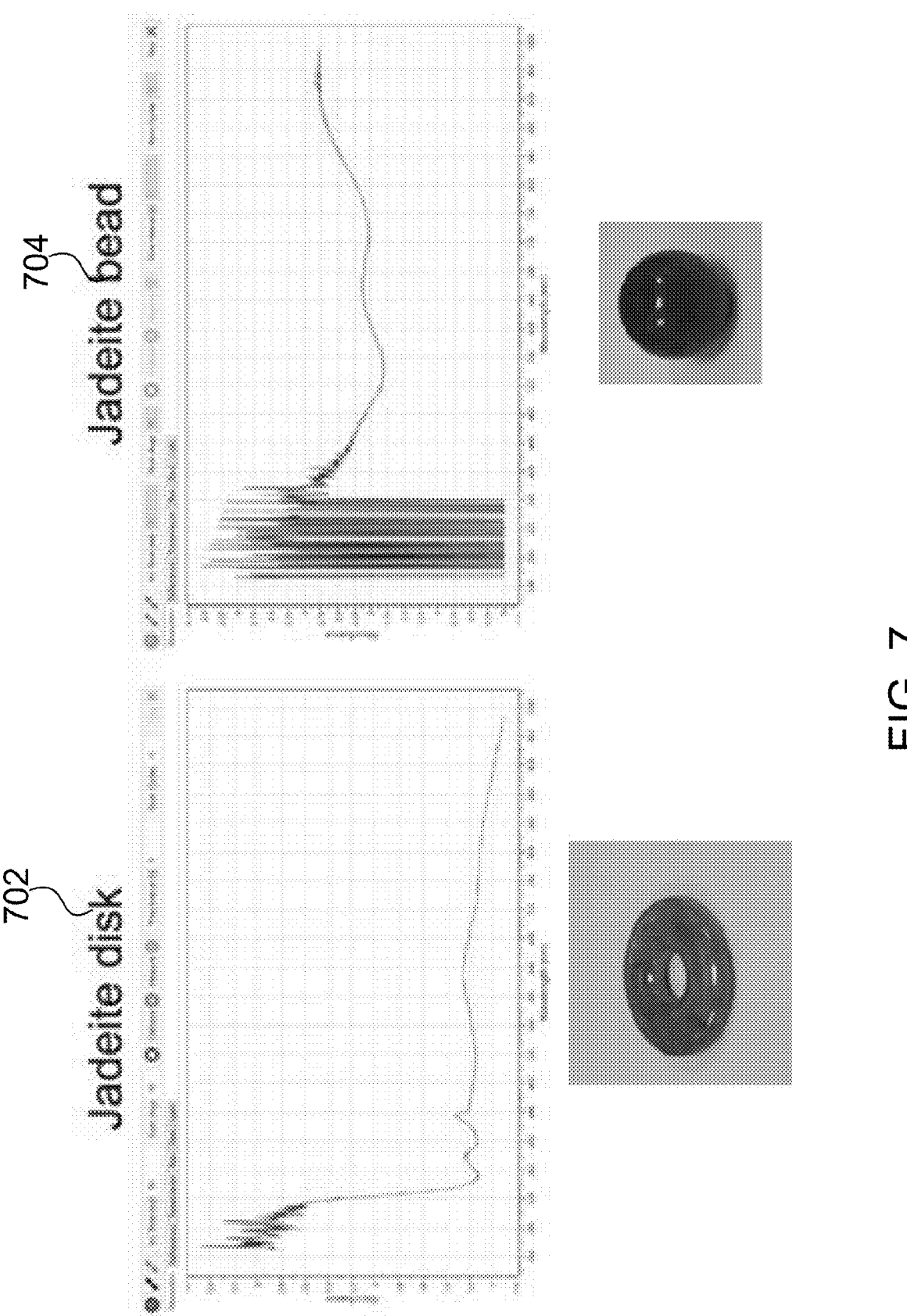
FIG. 7 is an illustration of an example charts calculated in accordance with certain aspects described herein.

FIG. 7 shows example graphs of absorbance against wavelength in nm for various samples of Jadeite colored stones in different shapes, such as a Jadeite disk 702, and Jadeite bead 704.

Figure 8:
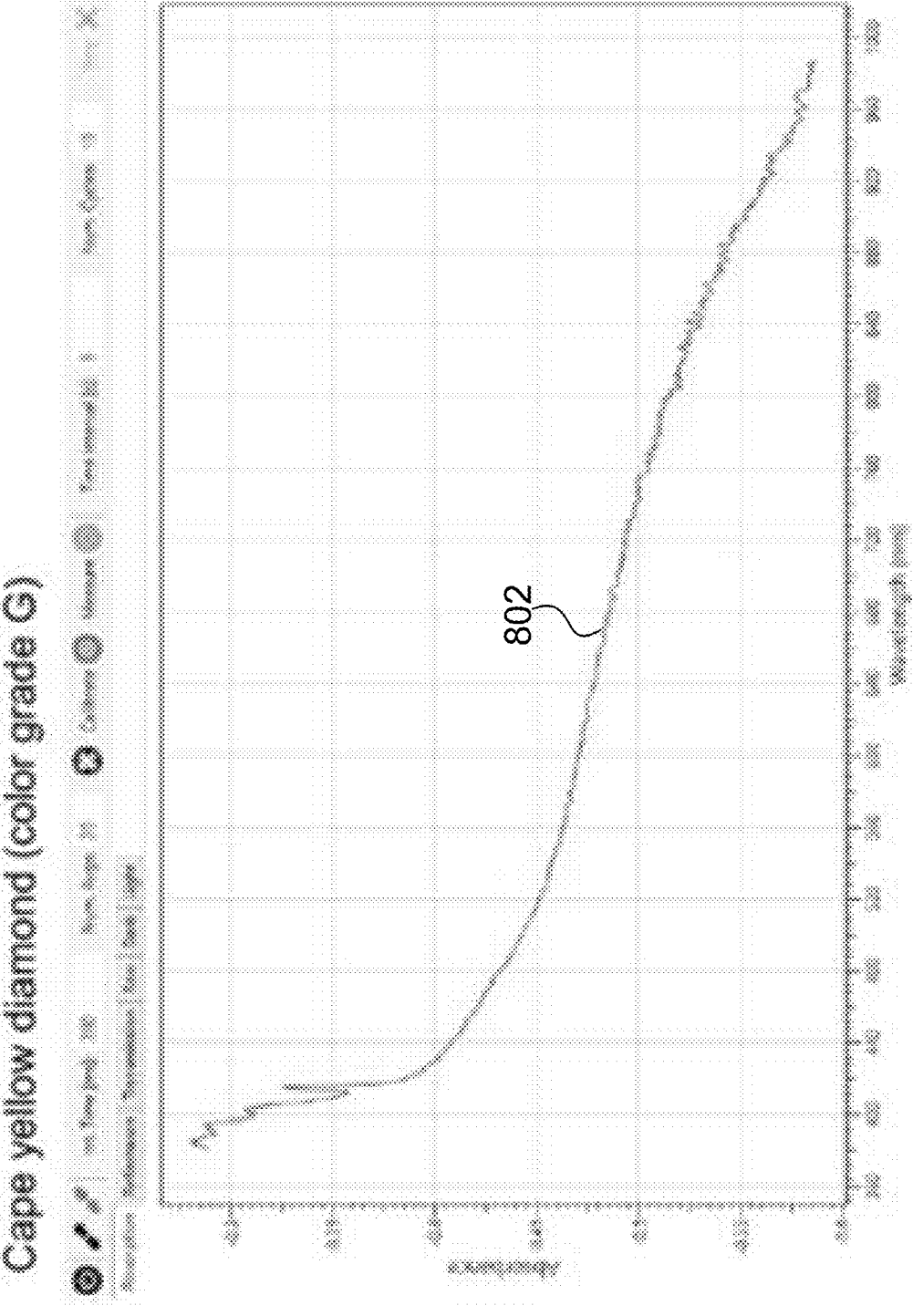
FIG. 8 is an illustration of an example chart calculated in accordance with certain aspects described herein.

FIG. 8 shows an example graph of absorbance against wavelength in nm for a Cape yellow diamond with color grade of G, 802.

Figure 9:
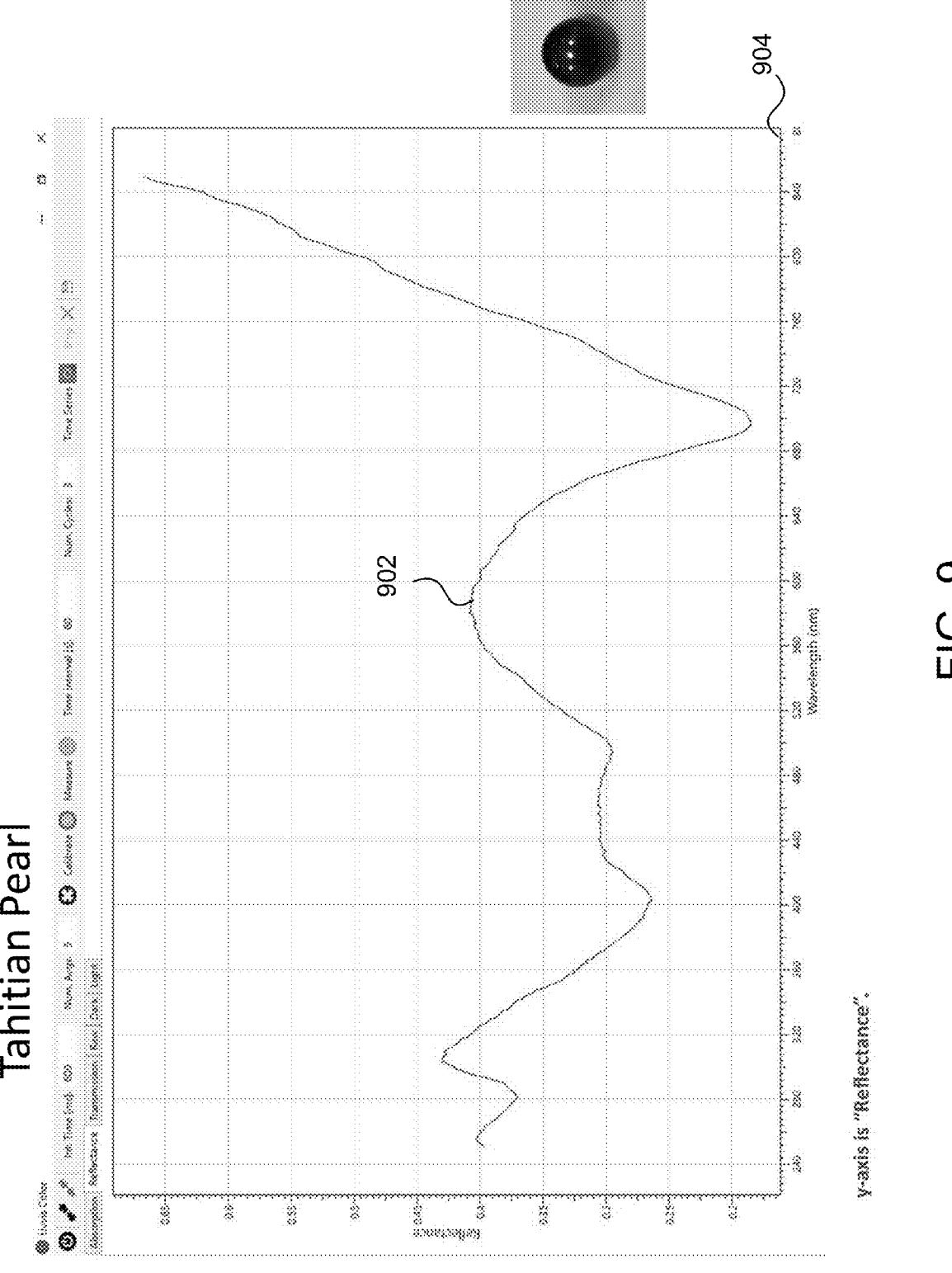
FIG. 9 is an illustration of an example chart calculated in accordance with certain aspects described herein.

FIG. 9 shows an example graph 902 of reflectance against wavelength in nm for a Tahitian Pearl with the y-axis 904 of this plot reflectance.

Time Resolved Absorption Spectrum Measurement Examples

Figure 10:
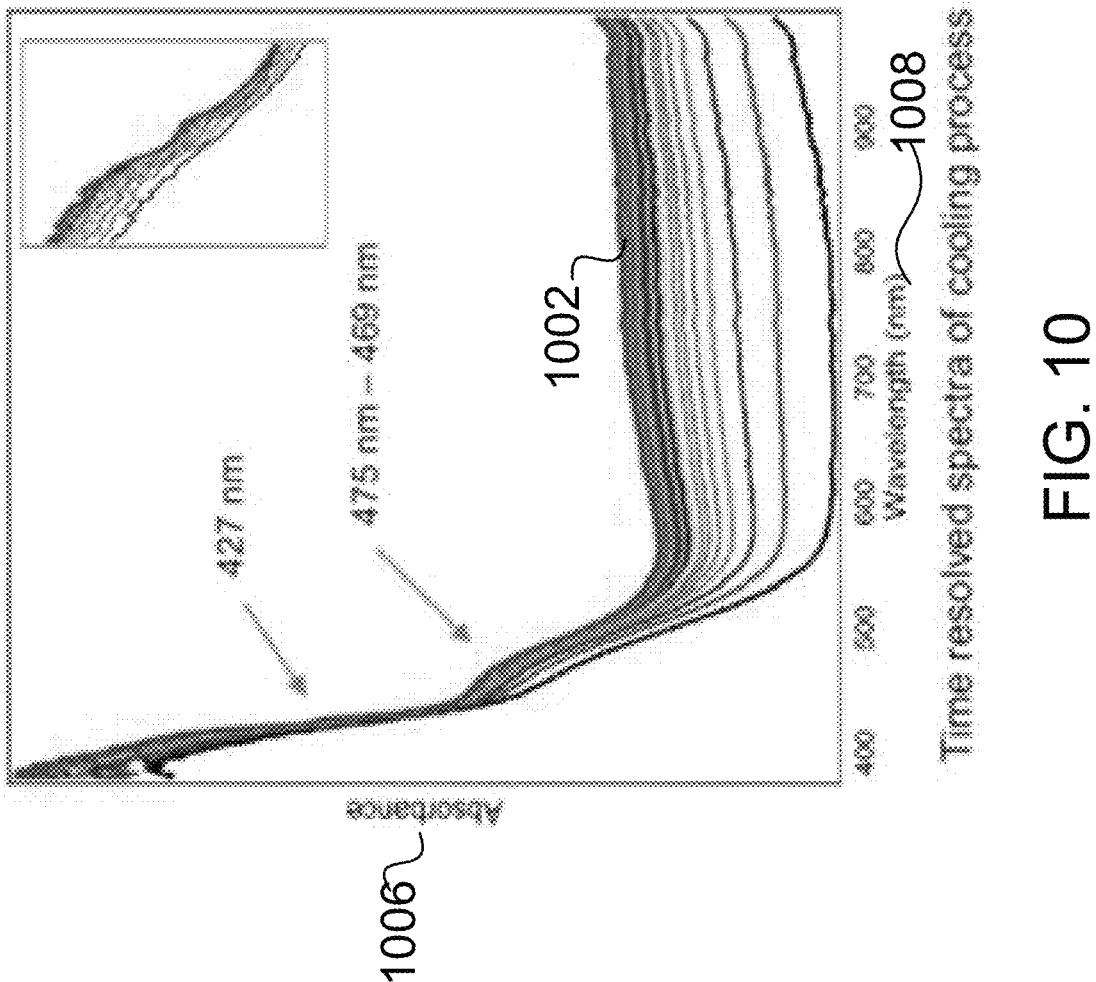
FIG. 10 is an illustration of an example chart calculated in accordance with certain aspects described herein.
Figure 11:
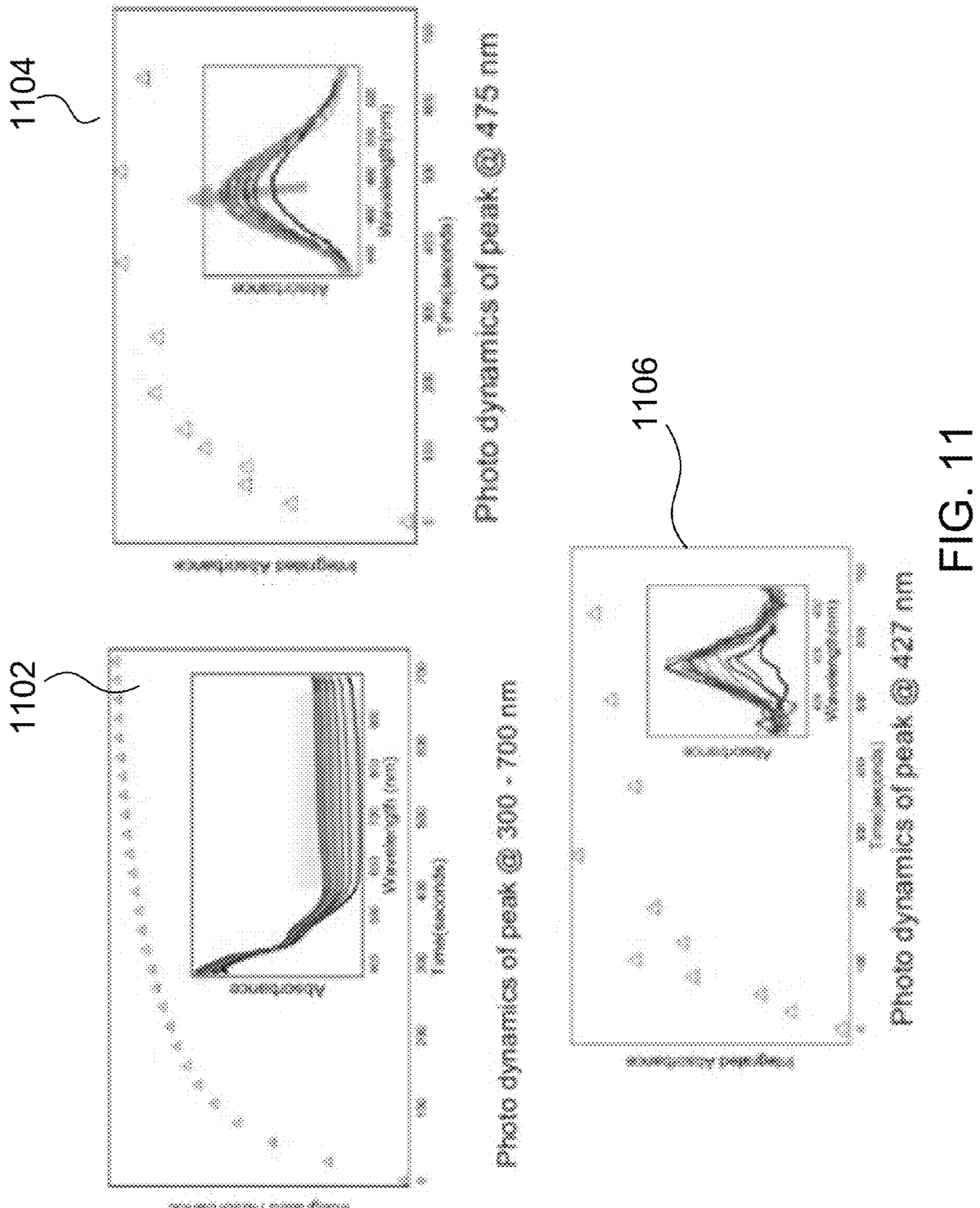
FIG. 11 is an illustration of an example charts calculated in accordance with certain aspects described herein.

Some precious stones may display time dependent responses of absorptive properties, which may be captured, graphed and analyzed. Systems and methods here including the software may be used in conjunction with the probe in UV/Vis spectrometer to collect a time series of absorption spectra of a sample after a photo- or thermal stress. For example, FIG. 10 shows a graph 1002 of time dependent absorption of a "chameleon" diamond with a plot of Absorbance 1006 and Wavelength 1008 in nm. Such a diamond may change color when it is heated or kept in the dark for a prolonged period of time. Studying these effects may allow investigation of fundamental thermochromics dynamics of such chameleon diamonds. FIG. 11 shows more detailed graphs of the graph of FIG. 10 where time resolved absorption spectroscopy of Chameleon diamonds such as Integrated Absorbance against Wavelength and Time in seconds and photo dynamics of peak at 300-700 nm 1102. Other graphs show details of graphs of photo dynamics of peak at 475 nm 1104 and photo dynamics of peak at 427 nm 1106.

Calibration and Measurement Steps

Figure 12:
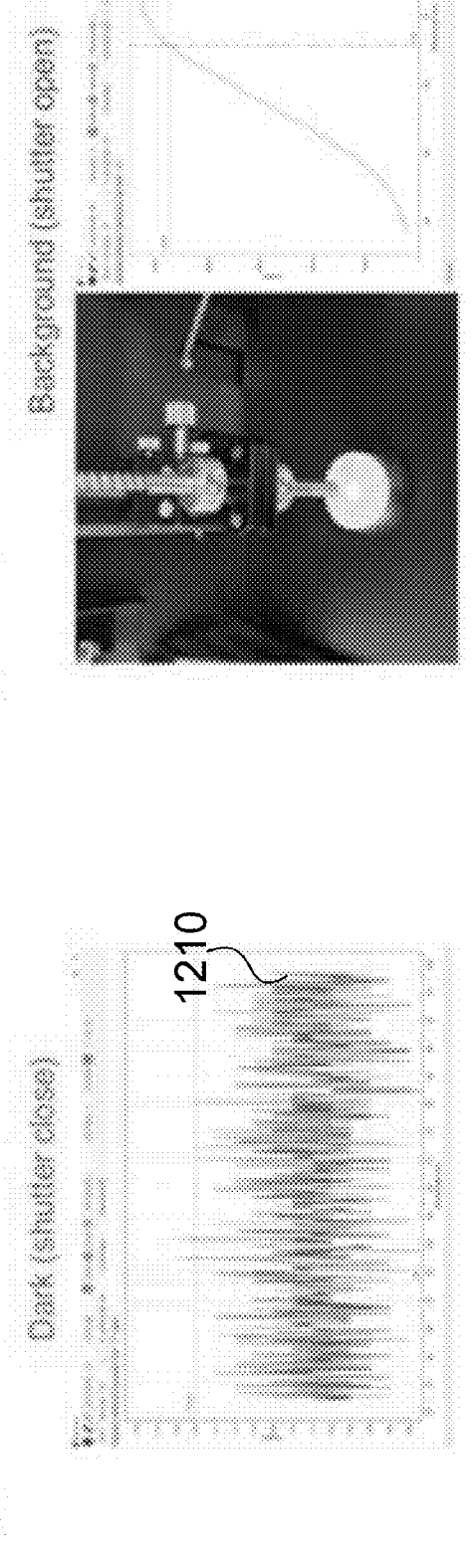
FIG. 12 is an illustration of an example charts calculated in accordance with certain aspects described herein.
Figure 12:
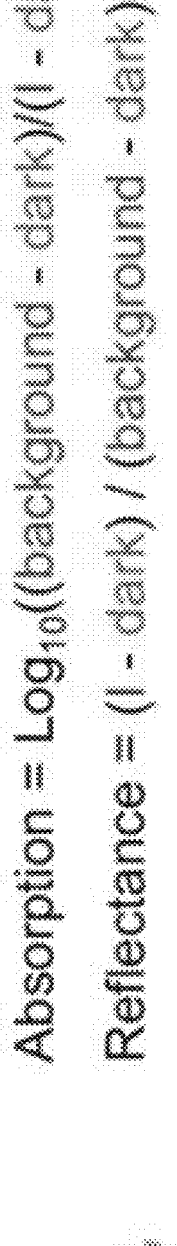

In some examples, before taking measurements using the systems and methods described herein, calibration steps on the machine(s) can be used to reset them for proper readings to be taken. For example, the systems may be re-calibrated each time the intergration time and number of averages are changed in the software. FIG. 12 shows some example Steps that may be used for calibration of the system(s) may include, Setting and integration time and average number; Conducting dark and background measurements with the Shutter Closed (chart example dark noise spectrum of spectrometer 1210) and shutter opened (chart example light background spectrum from reference 1220); putting the sample under the probe and measuring the signal 1230 where Absorption=Log10((background−dark)/(signal−dark)); Reflectance=(signal−dark)/(background−dark).

Fluorescence and Phosphoresce Measurement Examples

The systems and methods here may include the capability of measuring fluorescence and/or phosphorescence of diamonds, colored stones and/or pearls with fiber coupled reflection mode. Such features may be built into the overall UV/Vis spectrometer system (such as shown in FIG. 1) in addition to or in replacement of a Halogen lamp as described.

Such an arrangement may allow the system to be used to probe diamonds, colored stones and/or pearls for fluorescence and/or phosphorescence response with specific UV wavelength excitation using UV/Vis spectrometer. Such an arrangement may also allow the system to be used to probe for change in absorption response after exciting with UV light. In one such example, it may be used for measuring absorption response of so-called photochromic diamonds after exposing to specific UV light. The system may utilize software so the computer may send a signal to UV light sources to turn ON and collect time-resolved absorption spectrum after UV LED light source is turned OFF.

In some examples, it may be beneficial to utilize integration of fluorescence measurement, such as using short wave ultra violet SWUV, and/or long wave ultra violet LWUV, such as measurements of Fluorescence with 265 nm and 365 nm (LED) excitation.

Figure 13:
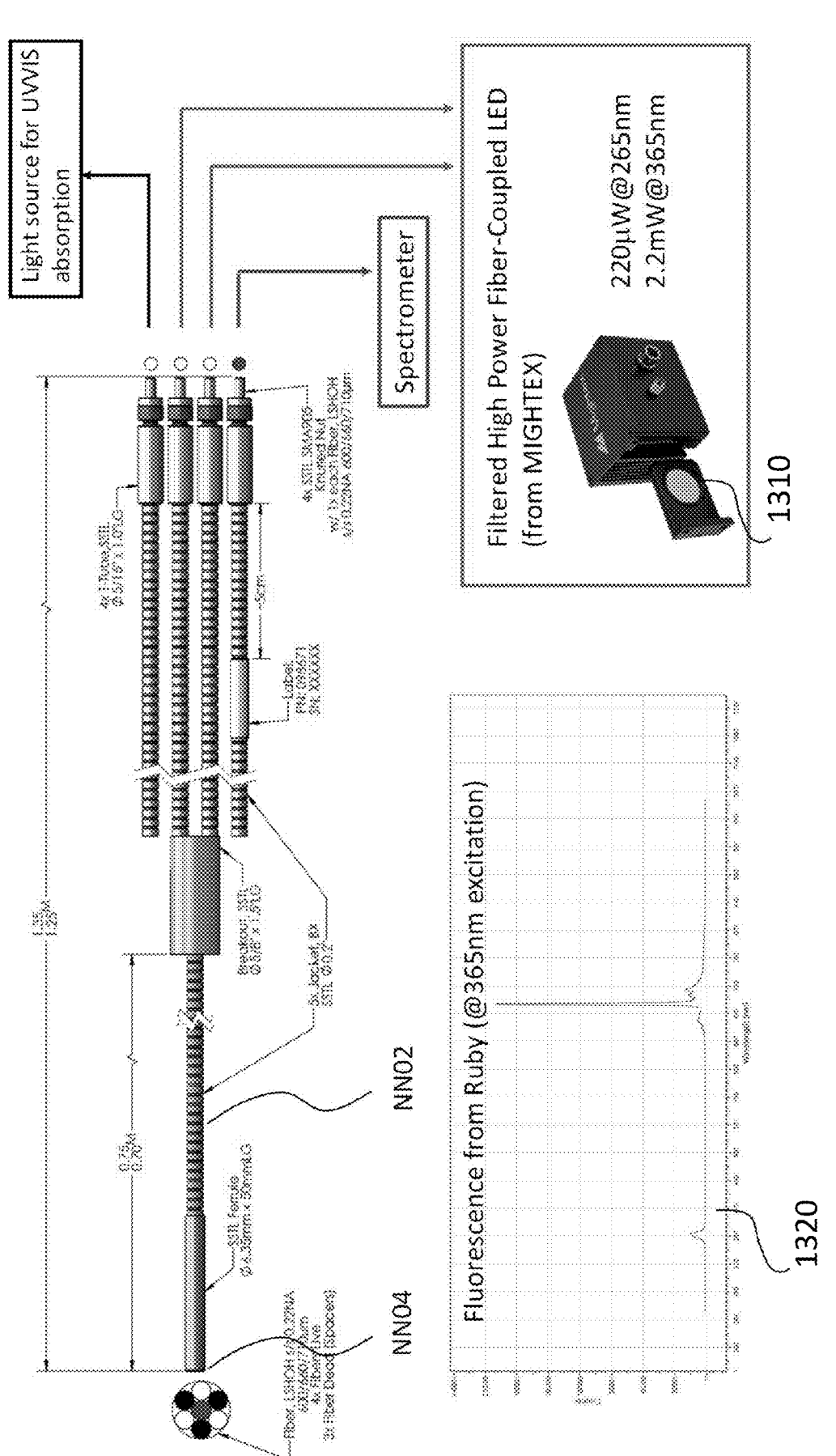
FIG. 13 is another illustration of an example spectroscopy system in accordance with certain aspects described herein.

FIG. 13 shows an example of a filtered high power fiber-coupled LED 1310 that may be used in such an arrangement coupled to a fiber line 1302. In some examples, the fiber line 1302 may include multiple fibers and connect the LED system 1310 and the probe end 1304. In some non-limiting examples, the LED may be a product may be made by MIGHTEX capable of producing 220 µW @265 nm and 2.2 mW @365 nm.

In some examples, graphs of counts against wavelength may be calculated from the system to record fluorescence including fluorescence of ruby 1320 or any other gemstone for analysis as described herein.

Networked System Examples

Figure 14:
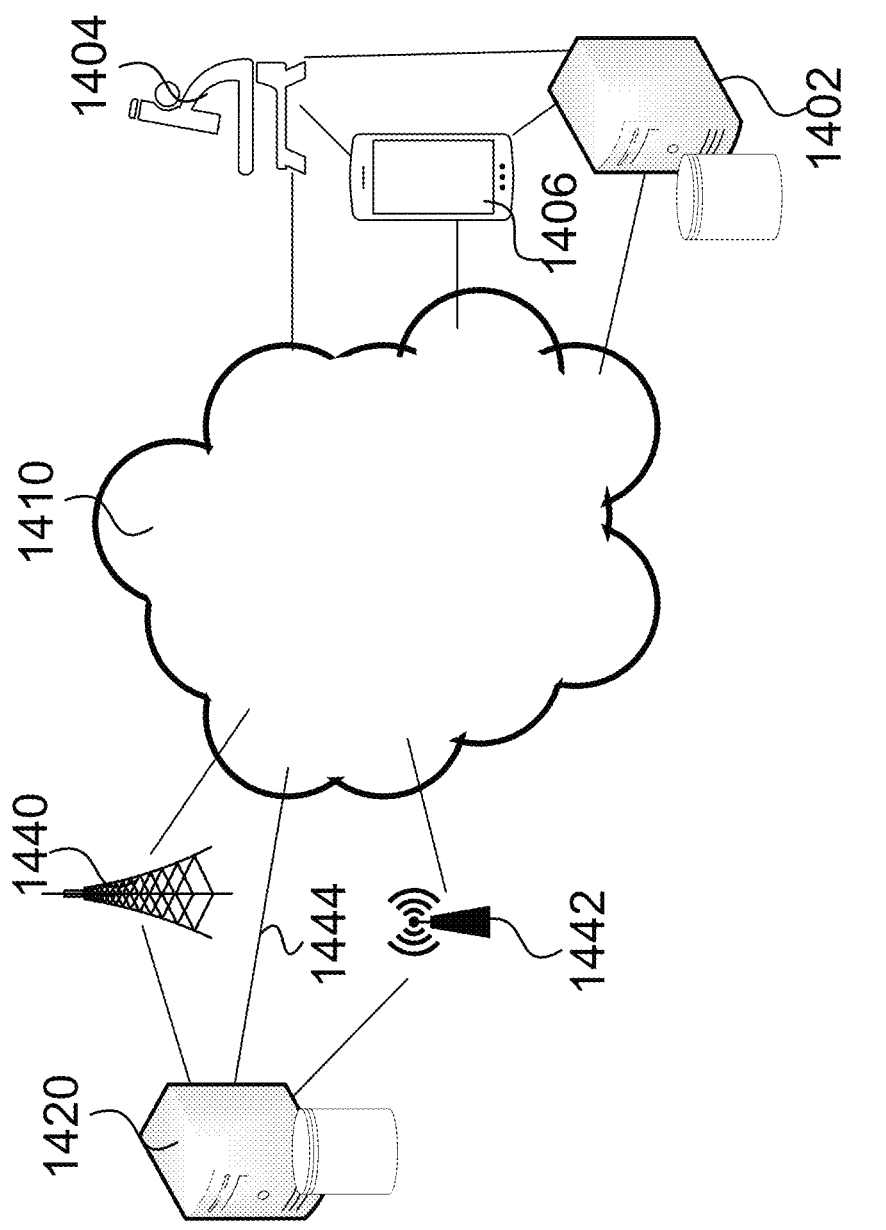
FIG. 14 is an illustration of an example networked system in accordance with certain aspects described herein.

In some examples, as shown in FIG. 14, a computer 1402 with processor and memory is configured to run software. The computer 1402 may be in communication with a network 1410 such as the Internet or local area network. Such computers may include any kind of computer such as but not limited to tablets, smartphones, desktops, laptops, or other computers 1406, and multiple computers may be in communication with one another or run the software as described herein. More detailed and/or further examples of such computers are found in FIG. 15. Other hardware components may include the UV-Vis device itself 1404 including but not limited to components described in FIG. 1 such as the reflectance measurement system.

Turning back to FIG. 14, the data captured from whichever computer 1402, 1406 may be analyzed on a back end system 1420 instead of or in addition to a local computer. In such examples, data may be transmitted to a back end computer 1420 and associated data storage for saving, analysis, computation, comparison, or other manipulation. In some examples, additionally or alternatively, the transmission of data may be wireless by a cellular 1440 or Wi-Fi 1442 transmission with associated routers and hubs. In some examples, additionally or alternatively, the transmission may be through a wired connection 1444. In some examples, additionally or alternatively, the transmission may be through a network such as the internet 1410 to the back end server computer 1420 and associated data storage. At the back end server computer 1420 and/or local computer systems 1402, 1404 and their respective associated data storage, the spectrometer data, sample identification, sample location, time, date, and/or any other associated test data may be stored, analyzed, compared to previously stored spectrometer data, identification, and/or any other kind of data analysis. In some examples, additionally or alternatively, the data storing, analyzing, and/or processing may be shared between the local computer 1402, 1404 and a back end computing system 1420. In such examples, networked computer resources may allow for more data processing power to be utilized than may be otherwise available at the local computers. In such a way, the processing and/or storage of data may be offloaded to the compute resources that are available. In some examples, additionally or alternatively, the networked computer resources 1420 may be virtual machines in a cloud or distributed infrastructure. In some examples, additionally or alternatively, the networked computer resources 1420 may be spread across many multiple physical or virtual computer resources by a cloud infrastructure. The example of a single computer server 1420 is not intended to be limiting and is only one example of a compute resource that may be utilized by the systems and methods described herein. In some examples, additionally or alternatively, artificial intelligence and/or machine learning may be used to analyze the spectrometer data from the samples. Such systems may employ data sets to train algorithms to help produce better and better results of analysis of samples.

Because the computer systems 1402, 1406 are in communication with the UV-Vis systems 1404, the software running on the computer(s) 1406, 1402 may be used for any number of things including but not limited to, power on the system, open and close the shutter on the UV-Vis device 1404, continuous spectra collection, calibration for both light and dark, collect spectra, stop collection and save.

Example Computer Devices

Figure 15:
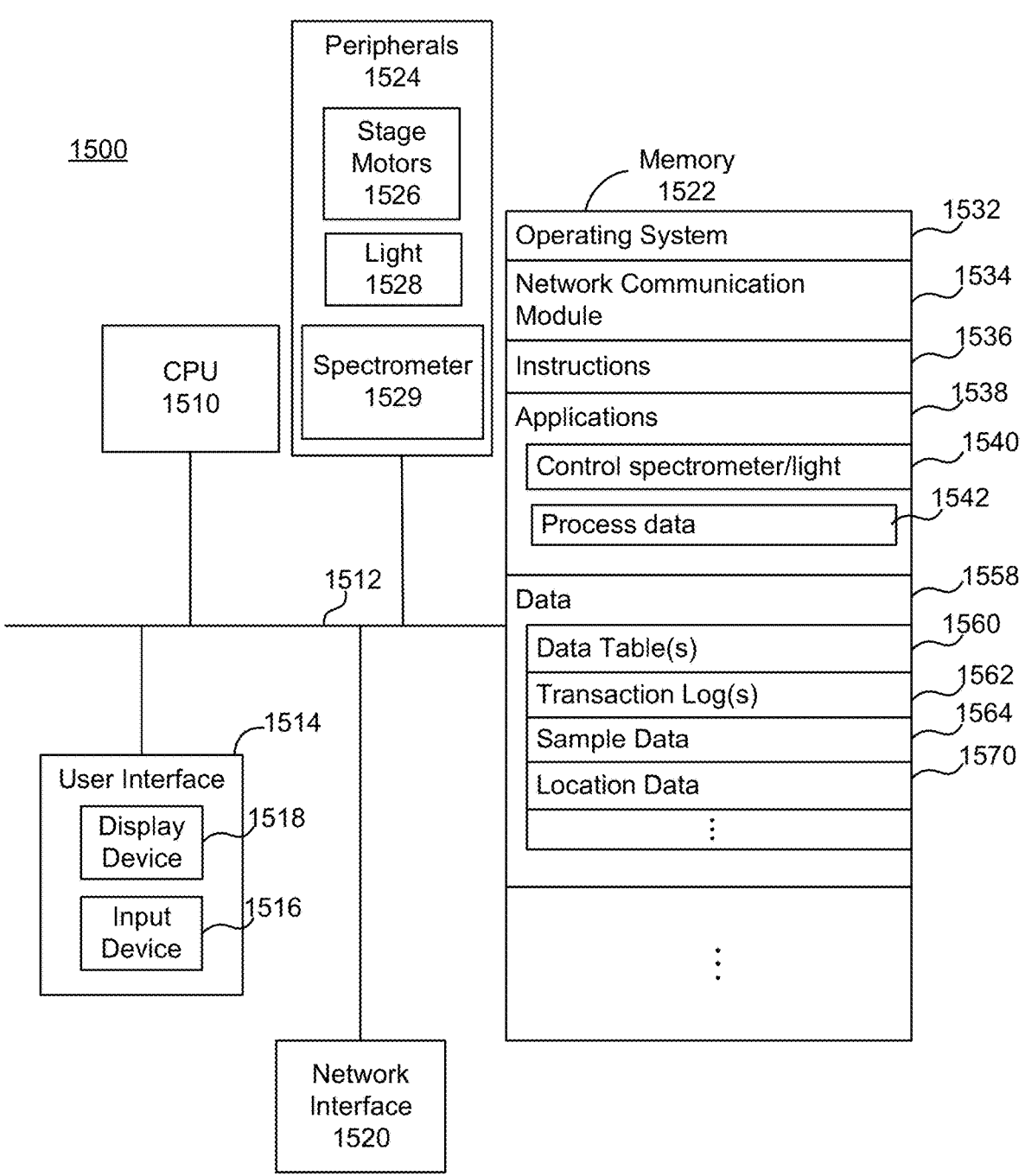
FIG. 15 is an illustration of an example computer system in accordance with certain aspects described herein.

FIG. 15 shows an example computing device 1500 which may be used in the systems and methods described herein. In the example computer 1500a CPU or processor 1510 is in communication by a bus or other communication 1512 with a user interface 1514. The user interface includes an example input device such as a keyboard, mouse, touchscreen, button, joystick, or other user input device(s). The user interface 1514 also includes a display device 1518 such as a screen. The computing device 1500 shown in FIG. 15 also includes a network interface 1520 which is in communication with the CPU 1520 and other components. The network interface 1520 may allow the computing device 1500 to communicate with other computers, databases, networks, user devices, or any other computing capable devices. In some examples, additionally or alternatively, the method of communication may be through WIFI, cellular, Bluetooth Low Energy, wired communication, or any other kind of communication. In some examples, additionally or alternatively, the example computing device 1500 includes peripherals 1524 also in communication with the processor 1510. In some examples, additionally or alternatively, peripherals include stage motors 1526 such as electric servo and/or stepper motors used for moving the probe up and down. In some examples peripherals 1524 may include light source 1528, and/or spectrometer 1529. In some examples, computing device 1500a memory 1522 is in communication with the processor 1510. In some examples, additionally or alternatively, this memory 1522 may include instructions to execute software such as an operating system 1532, network communications module 1534, other instructions 1536, applications 1538, applications to control the spectrometer 1540, and/or light source 1540, applications to process data 1542, data storage 1558, data such as data tables 1560, transaction logs 1562, sample data 1564, sample location data 1570 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., H3P, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A system for reflectance spectrometer analysis, the system comprising:
   a computer with a processor and memory, in communication with a spectrometer and a light source;
   a reflectance subsystem including,
      a bifurcated reflectance subsystem fiber bundle with a probe end mounted on a reflectance subsystem bracket frame connected to a vertical track, wherein the vertical track configured to allow the reflectance subsystem probe end to raise and lower over a reflectance subsystem stage, wherein the stage configured to hold a sample gemstone table-side down;
         wherein a first of the bifurcated reflectance subsystem fibers is in communication with the light source and a second of the bifurcated reflectance subsystem fibers is in communication with the spectrometer.

2. The system of claim 1 wherein the reflectance subsystem stage is an evaporating dish configured to hold liquid nitrogen the table-side down gemstone.

3. The system of claim 2 wherein the reflectance subsystem stage is made of Teflon.

4. The system of claim 1 further comprising a jewelry mount with a base and an arm configured to receive mounted jewelry, wherein the arm is made of reflective material.

5. The system of claim 4 wherein the jewelry mount is made of Teflon.

6. The system of claim 4 wherein the jewelry mount is made of aluminum.

7. The system of claim 1 wherein the light source has a wavelength between 190 nm and 2500 nm.

8. The system of claim 7 wherein the light source is either deuterium and/or tungsten halogen.

9. The system of claim 1 wherein the light source is a short wave ultra-violet light emitting diode configured to emit a principal wavelength of approximately 254 nm.

10. The system of claim 1 wherein the light source is a long wave ultra-violet light emitting diode configured to emit a principal wavelength of approximately 365 nm.

11. The system of claim 1 wherein the light source is a filtered deuterium lamp.

12. The system of claim 1 wherein the first and second bifurcated reflectance subsystem fibers is approximately 600 $\mu$m in diameter and separated by between 0.7 mm and 1.2 mm as measured from a center of each of the first and second bifurcated reflectance subsystem fibers.

13. The system of claim 1 wherein the light source has a wavelength between 190 nm and 2500 nm.

14. The system of claim 1 wherein the light source is a light emitting diode light source capable of emitting 265 nm and 365 nm wavelengths.

15. The system of claim 11 wherein the filtered deuterium lamp is configured to emit a wavelength between 200 nm and 400 nm.

16. The system of claim 1 wherein the fiber bundle includes six fibers including the first bifurcated reflectance subsystem fibers in communication with the light source.

17. The system of claim 16 wherein the six fibers in communication with the light source surround the second of the bifurcated reflectance subsystem fibers is in communication with the spectrometer.

* * * * *